SELF-DEVELOPING CAMERA

Original Filed April 2, 1964

INVENTOR
Richard R. Wareham
BY Brown and Mikulka
and
Robert E. Cobb
ATTORNEYS

SELF-DEVELOPING CAMERA

Original Filed April 2, 1964

INVENTOR.
Richard R. Wareham

BY Brown and Mikulka
and
Robert E. Cook
ATTORNEYS

INVENTOR.
Richard R. Wareham
BY Brown and Mikulka
and
Robert E. Cook
ATTORNEYS

SELF-DEVELOPING CAMERA

Original Filed April 2, 1964

INVENTOR.
Richard R. Wareham
BY Brown and Mikulka
and
Robert E. Cobb
ATTORNEYS

INVENTOR
Richard R. Wareham
BY Brown and Mikulka and Robert E. Cook
ATTORNEYS

INVENTOR.
Richard R. Wareham
BY Brown and Mikulka
and
Robert E. Cook
ATTORNEYS

United States Patent Office

Re. 26,595
Reissued June 3, 1969

26,595
SELF-DEVELOPING CAMERA

Richard R. Wareham, Marblehead, Mass., assignor to Polaroid Corporation, Cambridge, Mass., a corporation of Delaware Original No. 3,249,032, dated May 3, 1966, Ser. No. 356,908, Apr. 2, 1964. Application for reissue Oct. 26, 1967, Ser. No. 682,698
Int. Cl. G03b *17/52*
U.S. Cl. 95—13 8 Claims

Matter enclosed in heavy brackets [ ] appears in the original patent but forms no part of this reissue specification; matter printed in italics indicates the additions made by reissue.

*ABSTRACT OF THE DISCLOSURE*

*The camera housing consists of two sections which are movable with respect to each other so as to permit loading of two sheets, a photosensitive sheet and an image-recording sheet. Each section of the housing has a device for holding one of the two sheet supplies. The camera also includes pressure applying members, apparatus for locating successive areas of the photosensitive sheet in position for exposure, and apparatus for controlling the movement of the sheets through the camera including members for engaging successive portions of one of the sheets to arrest movement of the sheets.*

This invention relates to photographic apparatus and particularly to novel and improved cameras for exposing successive areas of a photosensitive sheet and processing the exposed areas by superposing the photosensitive sheet with a second sheet and distributing a liquid processing composition between the sheets.

Cameras of this type are constructed for use with a film assemblage comprising a photosensitive image-recording sheet, a second or image-receiving sheet and a plurality of rupturable containers of processing liquid mounted on the second sheet. The two sheets are coupled at their leading ends with a leader and are processed by moving the sheets in superposition between two juxtaposed pressure-applying members to distribute the processing liquid between the sheets to form a sandwich. The camera includes, in addition to the pressure-applying members, means including a pair of members for locating successive areas of the photosensitive sheet in position for exposure and means for controlling the movement of the sheets through the camera including members for engaging successive portions of one of the sheets, preferably the second sheet, to arrest movement of the sheets. The two sheets are supplied in separate coils and are loaded into the camera apart from one another so that within the camera, the photosensitive sheet is conducted from its coil between members which locate successive areas in position for exposure and then along a predetermined path into superposition with the second sheet between the juxtaposed pressure members; while the second sheet is conducted from its coil between a pair of members comprising the control means, along a path converging with the path of movement of the photosensitive sheet into superposition therewith between the pressure members. Thus the connected sheets are required to be loaded into the camera and each sheet threaded separately between a pair of members and thence together with the other sheet between a third pair of members.

The necessity for loading the sheets in this manner has resulted in two basic types of camera structures which may be termed either "thread loading," because a leader is threaded between the members of one or more pair, or "drop-in loading," in which supplies of the sheets are dropped into place without the necessity for threading a leader. The drop-in loading cameras are preferred because of the simplicity and ease of operation but necessitates more complex and expensive structures than the thread loading type of camera because the members (of three or more pairs) between which the sheets are moved are required to be spaced apart during loading. The well-known Polaroid Land camera comprising a three-section housing is typical of such a camera construction.

Objects of the invention are: to provide a simple and inexpensive self-developing camera structure of the type described with provision for drop-in loading of the connected photosensitive and second sheets; and to provide a drop-in loading camera of the foregoing type comprising a minimum of inexpensive components and including a housing consisting of only two relatively movable sections.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 7:
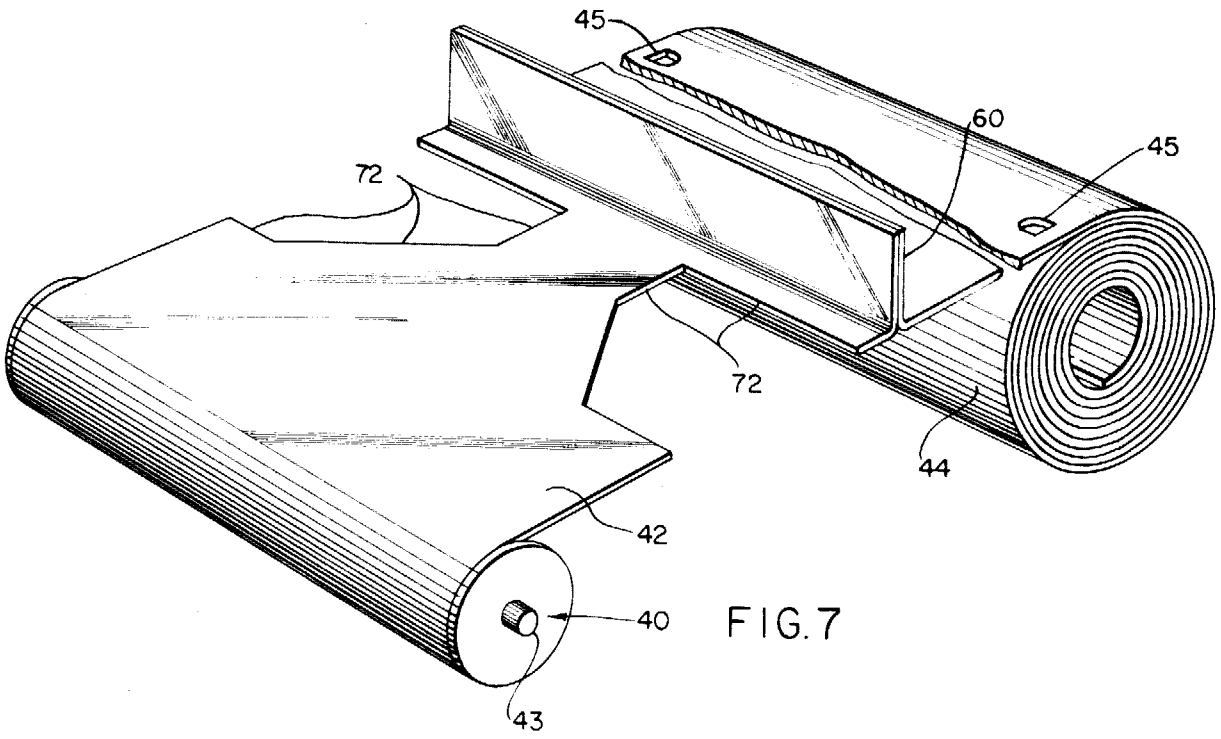
FIG. 7 is a perspective view of a roll film assemblage adapted for use in the camera.

The present invention is embodied in a camera of the so-called "Polaroid Land" type designed to employ a roll film assemblage of the type shown in FIG. 7, comprising a photosensitive image-recording sheet 42 coiled on a spool 40 and having a length sufficient for a plurality of exposures (e.g., 8); a second or image-receiving sheet 44 approximately equal in length to the image-recording sheet provided in a coil and joined at its leading end together with the image-recording sheet to a leader 60; and a succession of rupturable containers of processing liquid mounted on the second sheet in spaced relation, one container being provided for each area of the photosensitive sheet to be exposed and processed.

The camera of the invention, as shown in FIGS. 1 through 5 comprises a housing including a forward housing section generally designated 10 and a rear housing section designated 12, both housing sections being adapted to fabrication of organic plastic materials by conventional and inexpensive mass production methods, particularly as the two housing sections are so designed as to have very few dimensions with close tolerances and structural strength and rigidity are unnecessary. The forward housing section includes a forward wall 14, end walls 16 and 18 and side walls 20 and 22 all preferably formed as a single unit. The forward wall includes forwardly extending sections 24 cooperating with forwardly extending sections 26 of side walls 20 and 22 to provide a forwardly projecting chamber within the front of the camera providing a path for light admitted by a conventional lens and shutter assemblage 28 mounted on the forward portion of forwardly extending sections 24 and 26.

Means comprising a part of the forward housing section and also adapted to fabrication of organic plastic materials are provided for holding a supply of coils of the photosensitive and image-recording sheets locating successive areas of the image-recording sheet in position for exposure. In the form shown, these means comprise a unitary element or insert secured within and to the forward housing section and including side walls 30 and end wall 32 cooperating with a forward wall 14, end wall 16 and side walls 20 and 22 to provide a chamber open at the rear for holding a supply of photosensitive sheets; and a channel-shaped wall 34 at the opposite end of the insert cooperating with side wall 30 and forward wall 14 to provide a chamber open to the rear for containing a coil of the image-receiving sheet. Side walls 30 include end sections 36 each formed with a V-shaped notch 38 extending into the chamber formed by end wall 32, forward wall 14, end wall 16 and side walls 20 and 22 for supporting the shafts 43 at the ends of a spool 40 around which is coiled photosensitive image-recording sheet 42.

Rear housing section 12 cooperates with the forward housing section to enclose and mount the operative components of the camera and locate successive areas of image-recording sheet 42 in position for exposure. The rear housing section includes a rear wall 46 including an end section 48 pivotally coupled with end wall 16 at a hinge 50 and cooperating with the forward housing section to provide a closure for the chamber in which the image-recording sheet is contained; a lower section 52 including lateral portions projecting rearwardly; and side walls 54 and 56. Side walls 20 and 22 and end wall 16 of the forward housing section are formed at their rear edges with channels for engaging the forward edges of side walls 54 and 56 and end section 48 of rear wall 46 to form lighttight joints. A spring 58 is mounted intermediate its ends on the inside of end section 48 for pressing against the aligning discs on the ends of spool 40 for retaining the shafts of the spools within V-shaped notches 38 of end sections 36 and exerting tension on the photosensitive sheet as it is advanced. Rear housing section 12 is pivotable with respect to the forward housing section about hinge 50 from the closed or operative position shown in FIG. 2 to an open position to permit loading of the roll film assemblage into the camera.

The roll film assemblage as loaded into the camera takes the form shown in FIG. 7 and includes leader sheet 60 coupled with the leading ends of photosensitive sheet 42 and second sheet 44. The camera, as previously noted, is designed to be loaded by dropping the roll film assemblage into the open camera and then pivoting the camera housing sections into their closed position. In the camera shown, this is accomplished by dropping spool 40 into the chamber provided for that purpose with shafts 43 on the ends of the spool 40 resting in notches 38 and dropping the coil of image-receiving sheet 44 into the chamber defined by side walls 30 and channel-shaped walls 34 with the leading end portion of the image-recording sheet extending across and supported on the rear edges of side walls 30 between end wall 32 and channel-shaped wall 34. The rear edges of side walls 30 are formed with tracks 62 having rear surfaces for supporting successive areas of the image-recording sheet in position for exposure at the focal surface of the lens of assembly 28. The intermediate portion of rear wall 46 cooperates with side walls 30 to support the image-recording sheet against the rear surfaces of tracks 62 and guide the image-recording sheet from the chamber containing spool 40 toward the opposite end of the camera housing.

Each exposed area of the image-recording sheet is processed preferably to produce a positive transfer print, by superposing the exposed area with an area of the second sheet and advancing the sheets with a rupturable container therebetween between a pair of pressure-applying members to distribute the liquid content of the container between the superposed areas of the sheets to form a sandwich. In the camera of the invention, the two sheets or, at least layers thereof, are formed of a material opaque to light actinic to the photosensitive material (e.g., silver halide, of the image-recording sheet so that the sandwich can be withdrawn between the pressure-applying members directly from the camera into the light. The camera includes an opening designated 64 in the rear of the camera between a rear section 66 of end wall 18 (of the forward housing section) and lower section 52 of rear wall 46 (of the rear housing section) through which the sandwich is withdrawn manually from within the camera. Means are provided for sealing opening 64 against the admission of light and in the form shown comprise a light seal cover 68 secured to lower section 52 and including lips 70 extending across opening 64; and a light seal member 72 secured to an element (to be described fully hereinafter) mounted with the camera housing on the forward housing section and including a lip 74 extending toward light seal cover 68 across opening 64 so that lips 70 and 74 overlap one another within the opening. Light seal cover 68 and light seal member 72 are both formed of flexible materials preferably elastomers so that the lips thereof can be deformed to permit withdrawal of the sandwich from the housing through opening 64 while closely engaging the outer surfaces of the sandwich to prevent admission of light through opening 64 around the sandwich.

The camera includes a pair of pressure-applying members in the form of rolls 76 and 78, having generally cylindrical sheet-engaging surfaces and mounted in juxtaposition with their axes substantially in a common plane. Roll 76 is mounted on the forward housing section adjacent opening 64 and roll 78 is mounted on the rear housing section also adjacent opening 64 so that a plane, tangent to the surface of both rolls, extends through the medial portion of the opening in the camera housing. This construction provides for drop-in loading of the roll film assemblage with leader sheet 60 connected to both the photosensitive and second sheet extending between the pressure-applying rolls when the housing sections are pivoted into closed position.

A frame 80, adapted to formation of sheet metal, is provided within and mounted on the forward housing section for mounting roll 76, locating roll 78 with respect to roll 76, mounting means for biasing roll 76 toward roll 78 and mounting other components of the camera mechanism including means for controlling the advancement of the sheets through the camera. Frame 80 comprises a base member 82 shaped to fit within the forward housing section adjacent forward wall 14 and end wall 18; and two side members designated 84 and 86 disposed, respectively, adjacent side walls 20 and 22. Roll 76 includes shafts at its ends journaled in bushings 88 engaged for limited movement in elongated openings 90 in side members 84 and 86. Openings 90 are shaped and oriented so that roll 76 and the bushings in which it is journaled are movable linearly toward and away from roll 78. A torsion spring 92 is provided for biasing roll 76 toward roll 78 so that the rolls apply compressive pressure to the sheets as they are drawn between the rolls. Torsion spring 92 includes a U-shaped medial portion 94 engaged between base member 82 and a retaining member 96 formed from the base member; a pair of torsion arms 98 extending outwardly from U-shaped medial portion 94 generally parallel with the axis of roll 76, supported at their junctures with U-shaped medial portion 94 on a support member 100 formed from base member 82 and supported adjacent their outer ends on support member 102 formed from base member 82; and engagement arms 104 extending from the outer ends of torsion arms 98 into engagement with bushings 88.

Pressure-applying roll 78 includes a pair of shafts 106 at its ends journaled in elongated openings 108 in brackets 110 mounted on lower section 52 of rear wall 46. Openings 108 in brackets 110 are elongated in the plane common to the axes of the two rolls so that roll 78 is movable with respect to the bracket and the rear housing section toward and away from roll 76. Side members 84 and 86 include slots 112 each having sides spaced from one another by a distance approximately equal to the diameter of shaft 106 and extending in directions substantially perpendicular to the aforementioned plane through the axis of the rolls. When rear housing section 12 is pivoted into the closed position, shafts 106 are engaged in slots 112 so that side members 84 and 86 of frame 80 function to locate and retain roll 78 in a fixed position relative to frame 80 and the bias of spring 92 mounted on frame 80 is exerted against the frame itself rather than against the camera housing. Because the frame functions to position the two rolls with respect to one another and all the forces exerted by and upon the rolls are taken up by the frame, the dimensional tolerances of the housing sections and hinge 50 and the structure of the housing sections are not critical.

The camera includes latch means, also a part of frame 80, for retaining the housing sections in the closed position. The latch means comprise an elongated latch plate 114 mounted on rear wall 46 for sliding movement from side to side of the camera housing and hooks 116 on the rear portions of side members 84 and 86 for engaging the ends of latch plate 114. The means for mounting the latch plate for sliding movement on rear wall 46 will be described more fully hereinafter and include a manually engageable latch button including a shank portion extending through a slot 120 in rear wall 46 and secured to latch plate 114. A detent, also to be described hereinafter, is provided for restraining latch plate 114 against movement from the latched position shown in FIG. 1.

The camera, as previously noted, includes a mechanism for controlling the advancement of the sheets through the apparatus and including means for engaging successive portions of the second sheet to arrest the movement of the sheets. The camera of the invention is designed to employ a roll film assemblage in which second sheet 44 is provided with a succession of holes or openings 45 adjacent its margins with a pair of holes 45 being provided for each area of the second sheet to be processed. In the operation of the camera, the second sheet is drawn manually together with the image-recording sheet past the control mechanism between rolls 76 and 78 through opening 64 from the camera until an arresting device comprising the control mechanism becomes engaged in either or both of a pair of holes 45 in the image-receiving sheet arresting the movement thereof. This occurs when an exposed area of image-recording sheet 42 has been advanced in superposition with a corresponding area of the image-receiving sheet between the pressure-applying rolls from the camera and the next succeeeding area of the image-recording sheet is located in proper position for exposure on tracks 62. Following exposure of this area of the image-recording sheet, processing thereof is accomplished by withdrawing the arresting means from engagement with the openings in the image-receiving sheet so that the sheets may again be withdrawn from the camera between the pressure-applying rolls. The control or sheet arresting mechanism includes engagement means for engaging opening 45 in the margins of the image-receiving sheet to arrest the movement of the sheets. The engagement means comprise an engagement member 122 formed of a resilient material and including a central portion 124 at which it is mounted on a bracket 126 formed from base member 82 of frame 80; pair of elongated arms 128 extending in opposite directions from central portion 124 and deformable in mutually perpendicular directions; and fingers 130 on the ends of arms 128. Engagement member 122 is mounted on bracket 126 with arms extending towards the sides of the camera adjacent pressure roll 76 between channel-shaped wall 34 and end wall 18. Arms 128 are deformable so that fingers 130 are movable toward and away from roll 76 in the direction of movement of the image-receiving sheet between the rolls and in a direction normal to the direction of movement of the image-recording sheet between the rolls. Arms 128 are so constructed and the engagement member is so mounted that fingers 130 normally extend into the path of movement of the image-recording sheet between the rolls and are disposed in a position spaced from roll 76 toward the front of the camera. Channel-shaped wall 34 is provided with slots 132 in its rear portion to permit fingers 130 to project into the path of movement of the image-receiving sheet and the forwardmost position of the fingers may be limited by the depth of slots 132.

Figure 1:
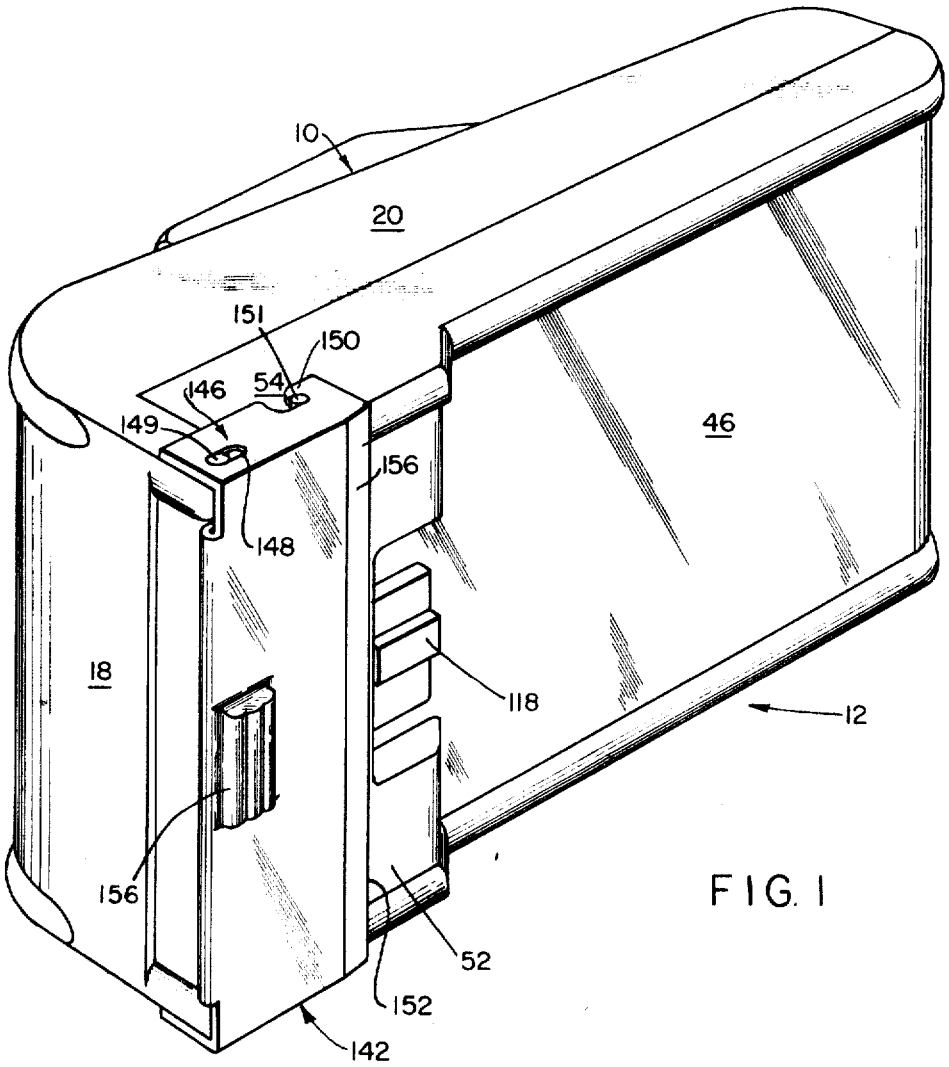
FIGURE 1 is a rear perspective view of a camera embodying the invention.
Figure 2:
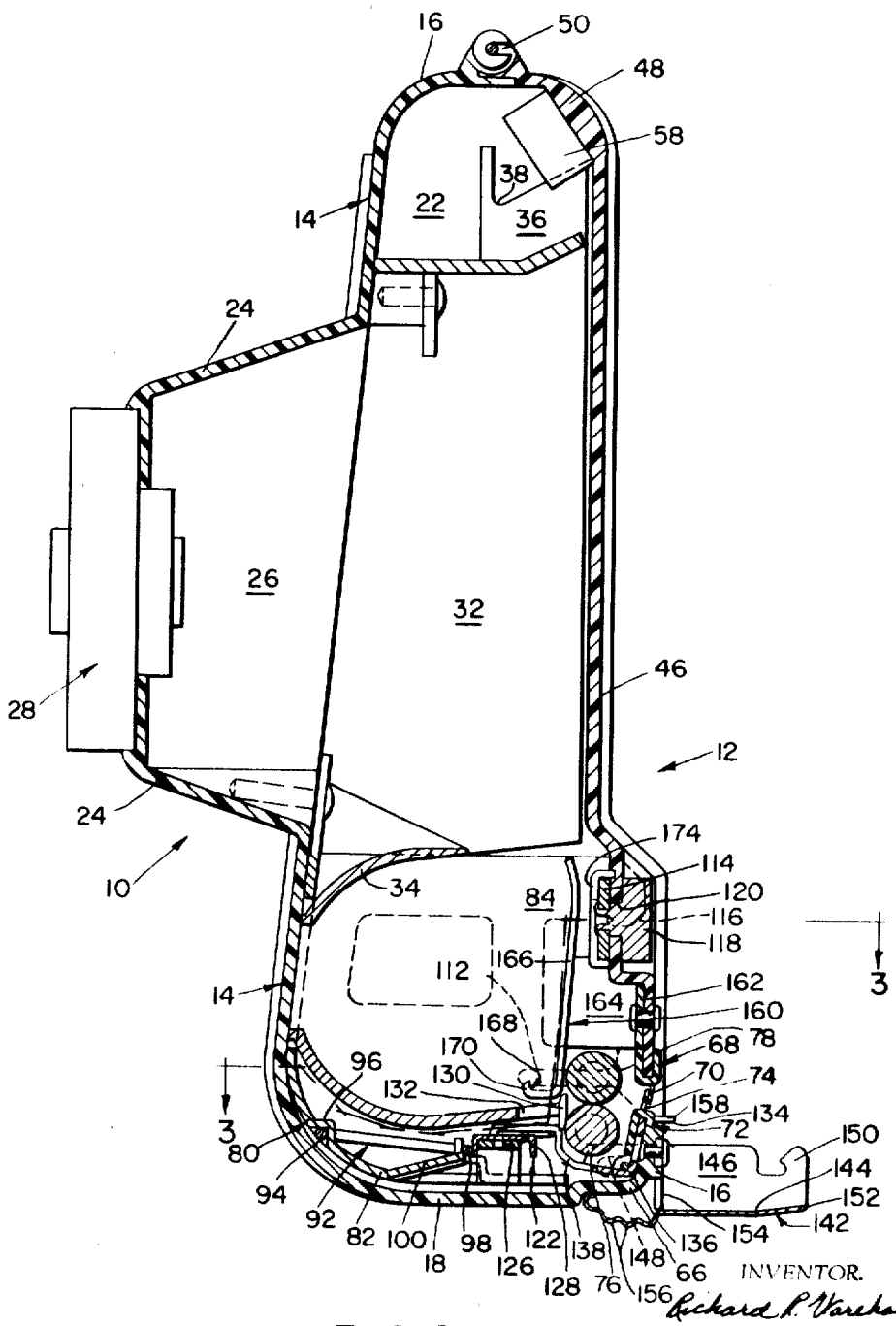
FIG. 2 is a sectional view of the camera taken substantially midway between the sides thereof.
Figure 3:
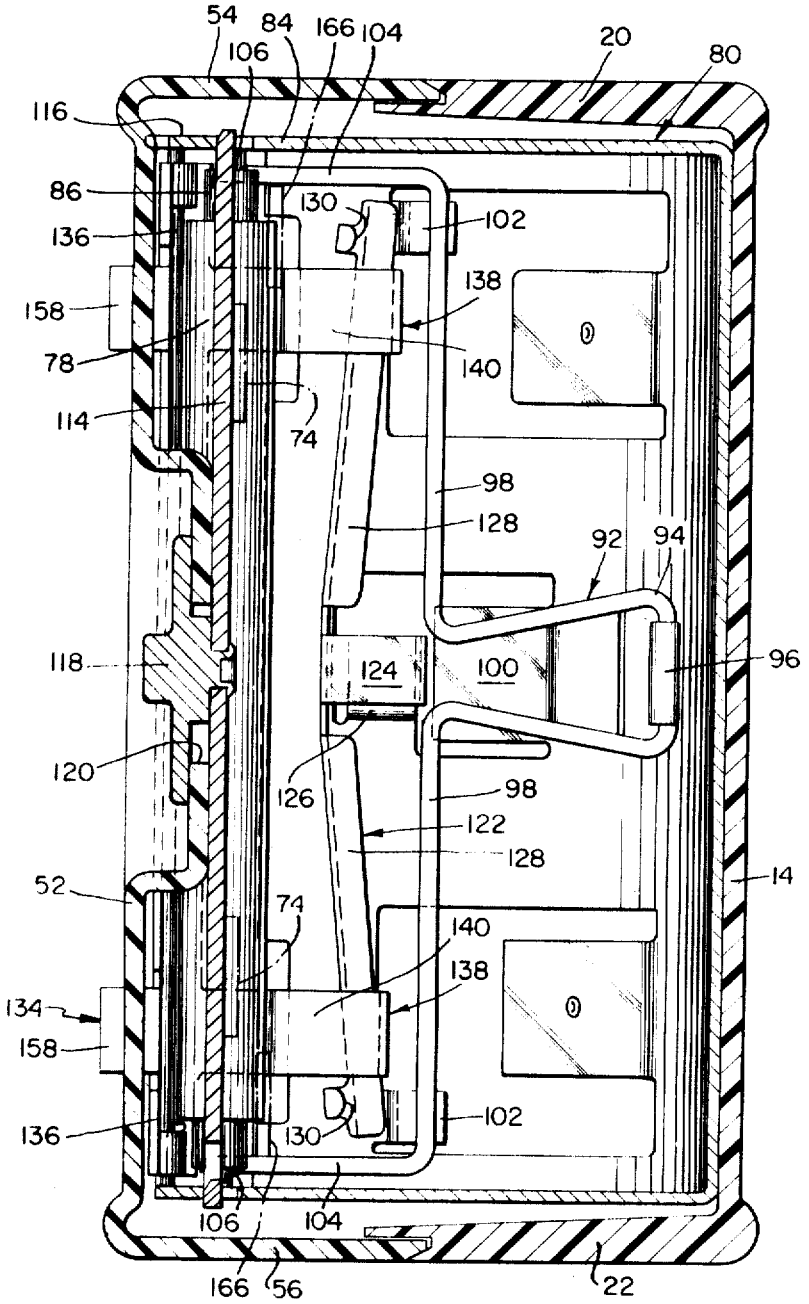
FIG. 3 is a sectional view taken along the lines 3—3 of FIG. 2.
Figure 4:
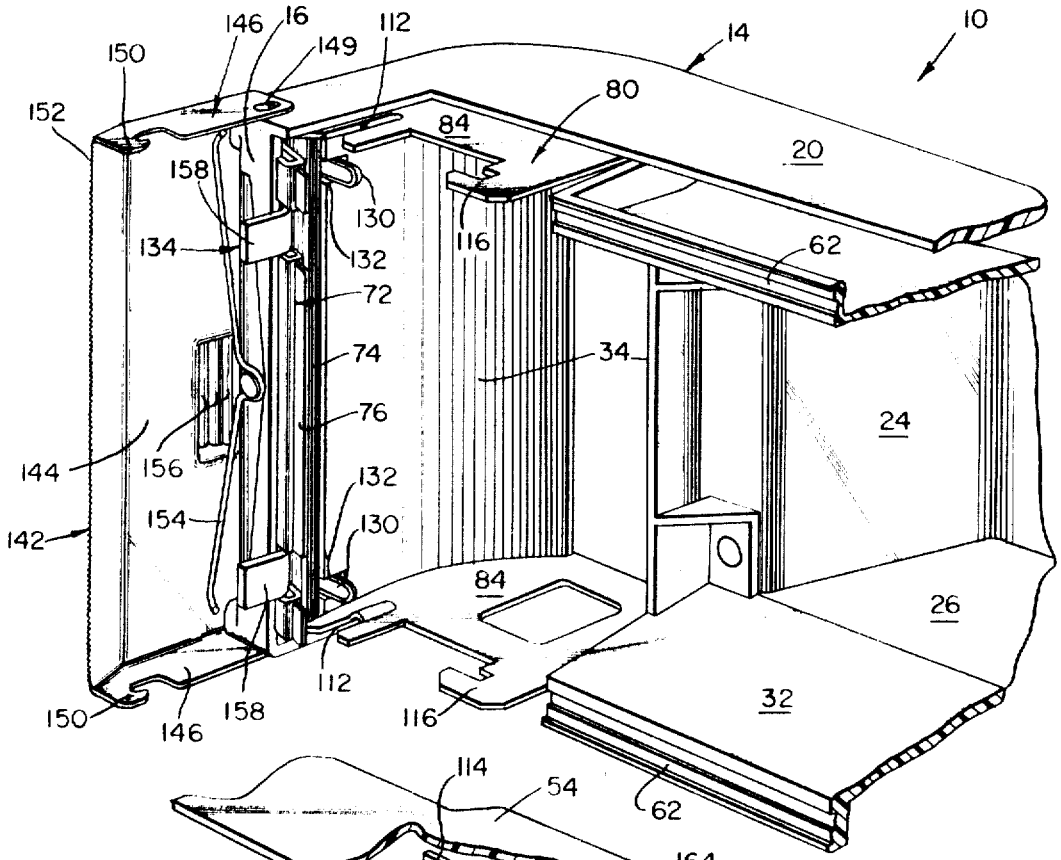
FIG. 4 is a fragmentary perspective view of the forward section of the camera shown with the rear section removed.
Figure 5:
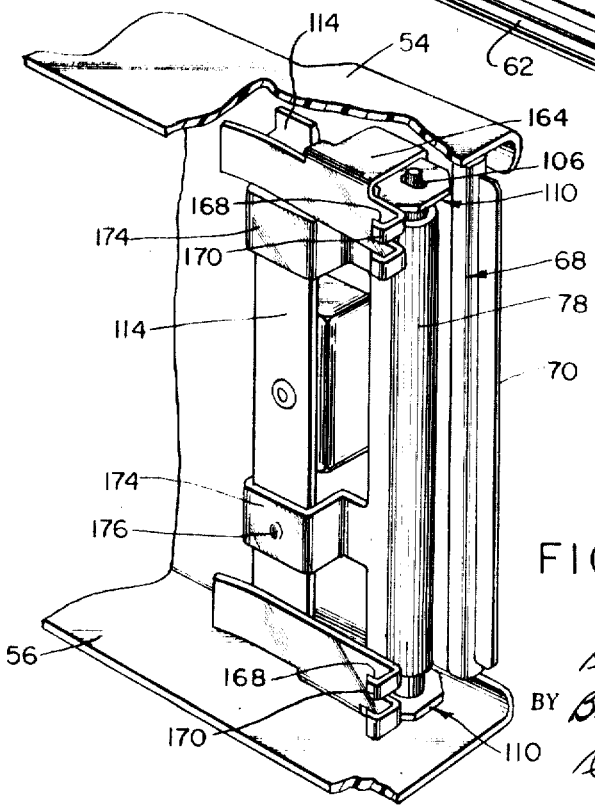
FIG. 5 is a fragmentary perspective view of the rear section of the camera shown with the forward section removed.
Figure 6:
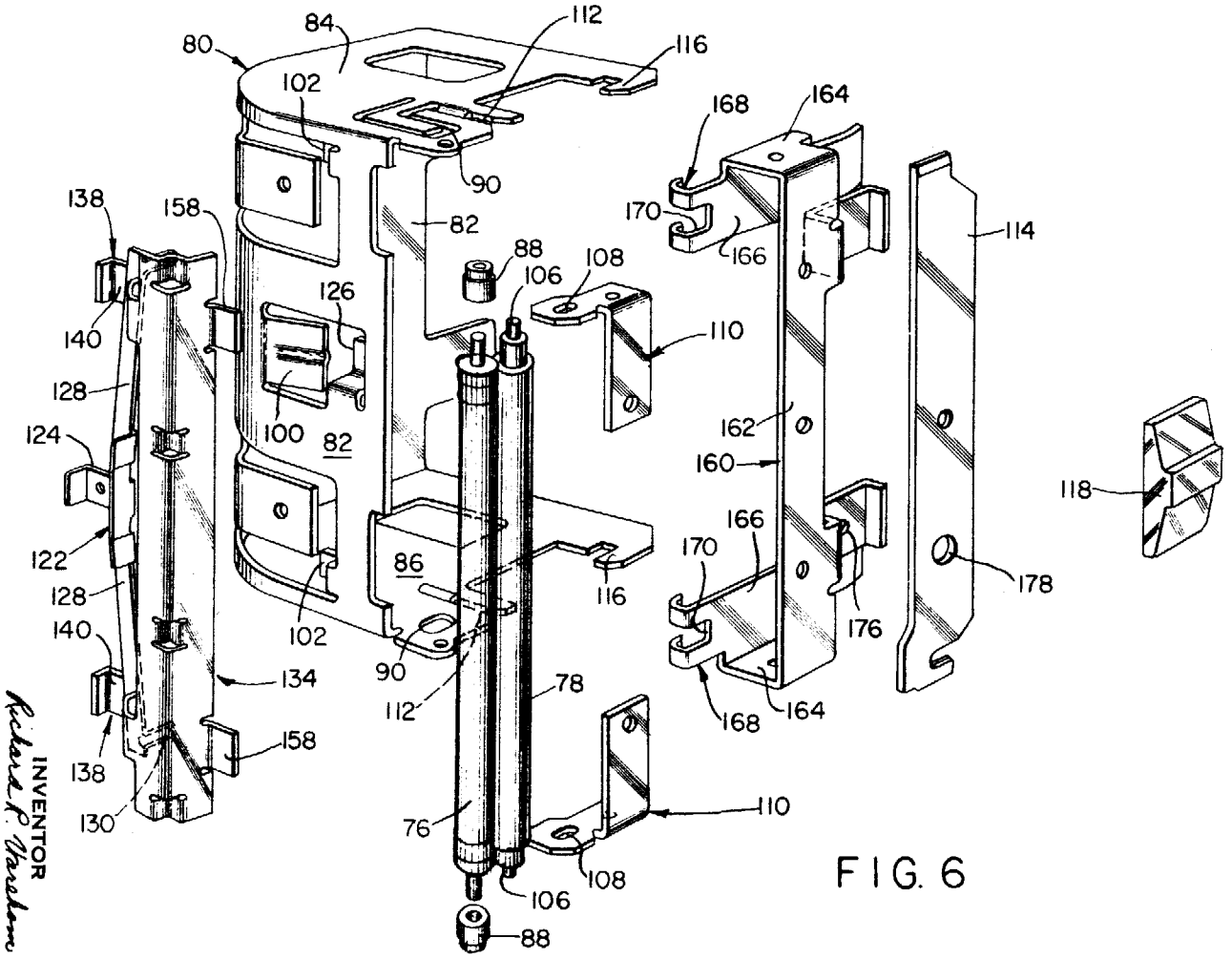
FIG. 6 is an exploded perspective view of the mechanism of the camera.

In the operation of the camera, fingers 130 are biased into engagement with the marginal portions of the image-receiving sheet as the sheet is moved past the fingers between the pressure-applying rolls and when openings 45 in the margins of the image-receiving sheet become aligned with fingers 130, the fingers drop into the openings and are moved by the sheet toward the rear of the camera and roll 76 to the position shown in FIG. 2. The control mechanism includes means for arresting this rearward motion of the fingers in engagement with openings in the sheets to arrest the movement of the image-recording sheet and, in the form shown, these means comprise a control lever 134, preferably formed of pressed sheet metal and including a medial portion pivotally mounted on a pin 136 mounted at its ends on side members 84 and 86 of frame 80. Control lever 134 includes a pair of arms 138 extending from the medial portion of the control member between end wall 18 and pressure roll 76 toward the front of the camera and thence between the pressure roll and arms 128 between the latter and wall 34. Arms 138 include generally planar portions 140 disposed between arms 128, and wall 34 and the path of movement of the image-receiving sheet. Arms 138 are located near the ends of arms 128 and pins 136 and control the movement of the arms and the fingers mounted thereon. Arms 128 are biased toward planar portion 140 and are movable in engagement with the planar portions 140 of arms 138 in the direction of movement of the image-receiving sheet toward and away from roll 76. In order to disengage fingers 130 from the opening in the image-receiving sheet to permit advancement of the sheets, control lever 134 is pivoted in a counterclockwise direction to the position shown in broken lines in FIG. 2 thereby deforming arms 128 toward end wall 18 until fingers 130 have been retracted from holes 45 in the image-receiving sheet. Pivotal movement of lever 134 need be only momentary inasmuch as arms 128 move forwardly in a direction opposite to the direction of movement of the image-recording sheet as soon as they are retracted from the holes therein, so that when control lever 134 is permitted to return to its original position under the bias of arms 128, fingers 130 move into engagement with the second sheet behind the holes in which they were previously engaged in readiness for engaging the next successive pair of holes in the image-receiving sheet.

Following withdrawal of a length of the sandwich comprising areas of the image-recording and image-receiving sheets, the length of the sandwich is severed from the portions of the sheets remaining within the camera; and, for this purpose, there is provided a cutter bar 142 preferably formed of pressed metal and comprising a base section 144 and dependent side sections 146. Cutter bar 142 is pivotally mounted on side walls 20 and 22 of the forward housing section between pressure roll 76 and end wall 18 near rear section 66 on a pair of studs 149 engaged in elongated openings 148 in side sections 146. Cutter bar 142 is pivotable about the studs between an open position shown in FIG. 2 and a closed position shown in FIG. 1 in which base section 144 extends across opening 64 in closing relation thereto. A pair of hook-shaped latch sections 150 are provided on side sections 146 for engaging studs 151 on side walls 54 and 56 of the rear housing section for retaining the cutter bar in its closed position. The sandwich is severed by drawing it against edge 152 of base section 144 which may be sharpened or serrated to facilitate tearing of the sandwich. A spring 154 is provided mounted on rear section 66 for urging latch sections 150 into engagement with studs 151 on side walls 54 and 56. To release and open the cutter bar, the operator manually moves the cutter bar against the bias of spring 154, this motion being made possible by enlarged openings 148, thereby disengaging latch sections 150 from studs 151. In order to indicate to the operator the direction in which to apply a manual force to the cutter bar to release it, the base section 144 includes a portion formed with ribs 156 which also facilitate linear movement of the cutter bar against the bias of spring 154.

In the operation of the camera, cutter bar 142 is opened in order to permit the operator to grasp the leading end of the sandwich projecting from the camera through opening 64 in order to withdraw the sheets from the camera, and following withdrawal of a predetermined length of the sandwich from the camera, cutter bar 142 is closed in order to facilitate severance of the sandwich from the remainder of the sheets. Closure of the cutter bar is also made effective to automatically disengage fingers 130 from openings 45 in the second sheet so that the sheets may again be advanced when the cutter bar is opened. For this purpose, control lever 134 includes a pair of arms 158 and projecting rearwardly from the housing through openings 64 into positions at which they are engaged by base section 144 of cutter bar 142 when the latter is pivoted into its closed position. Thus when the cutter bar is closed, arms 158 are displaced inwardly (forwardly) pivoting control lever 134 in a counterclockwise direction to disengage fingers 130 from openings 45 in a second sheet 44. Light seal member 72 is constructed in the form of a boot adapted to fit over the medial portion of control lever 134.

The sheet arresting mechanism must, of necessity, include means for supporting the second sheet against fingers 130 so that the fingers enter the openings in the sheet and it is this support means and the fingers which comprise the pair of members between which the second sheet must be threaded by itself during loading of the roll film assemblage into the camera. The support means of the invention comprise a support member 160 preferably formed of pressed metal and including a base section 162 mounted on lower section 52 of rear wall 46; a pair of lateral sections 164 dependent from the ends of base section 162 and extending toward the front of the camera adjacent the lateral edges of the path of movement of the image-recording sheet in approximately the same planes as side members 84 and 86 of frame 80; and a pair of support sections 166 mounted intermediate their ends on lateral sections 164 and disposed between the path of movement of image-recording sheet 42 and the coil of second sheet 44 contained within the recess defined by channel-shaped wall 34 and side walls 30. Each of support sections 166 includes a foot 168 located in juxtaposition with a finger 130 for supporting the second sheet against the finger. Each foot 168 is provided with a slot 170 extending parallel with the direction of movement of the second sheet and fingers, to permit the fingers to project through openings in the second sheet supported against feet 168 and be movable with respect to the sheet while projecting through openings in the second sheet into slots 170. Support sections 166 also function to guide the image-recording sheet into juxtaposition with the image-receiving sheet between rolls 76 and 78 and retain the coil of second sheet 44 within the chamber provided therefor in the forward section of the camera housing.

It is apparent that support sections 166 are disposed between the image-recording and image-receiving sheets forwardly of the image-recording sheet, that is, on the opposite side thereof from the housing section on which the support members are mounted. In order to provide for drop-in loading of the roll film assemblage and locating of the support sections between the two sheets so that the image-receiving sheet is threaded between the support sections and fingers 130, the leading end portion of the image-recording sheet is formed with cutouts 172 in its lateral margins to accommodate support sections 166. Cutouts 172 are located only in the leading end portion of the image-recording sheet so that as soon as the sheets are advanced, marginal portions of the image-recording sheet become engaged between support sections 166 and the rear of the camera housing so that the support sections then function to guide the image-recording sheet into superposition with the image-receiving sheet between the pressure rolls.

Support member 160 also includes a pair of arms 174 extending from base section 162 adjacent rear wall 46 across latch plate 114. Arms 174 are formed in the shape of channels which cooperate with rear wall 46 to mount latch plate 114 for lengthwise sliding movement. A dimple 176 is provided on one of arms 174 for engaging an opening 178 in latch plate 114 to function as a detent for retaining the latch plate in its latched position.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus comprising a housing including first and second sections movable with respect to one another to permit loading of two sheets, coupled at their leading ends, into said housing, said first section including means for holding separate supplies of [said first and second sheets] *a one sheet and another sheet,* means for guiding said sheets along convergent paths into superposition and one of a pair of pressure members for pressing said sheets into superposition, said second section including means cooperating with said first section to guide [the other of said sheets] *said other sheet* into superposition with said one sheet and the other of said pressure members, in combination:

control means mounted on said first section including an engagement member projecting into the path of movement of said one sheet adjacent said one pressure member for engaging portions of said one sheet to arrest the movement of said sheets through said apparatus;

a backing member for supporting said one sheet against said control means and said engagement member thereof; and a support member mounted on said second section adjacent an edge of said path of movement of said other sheet and extending past said other sheet toward said first section, said backing member being mounted on said support member between said convergent paths of said sheets adjacent said control means in juxtaposition with said engagement member.

2. The photographic apparatus of claim 1 in which said means for guiding said sheets guide said sheets along paths which converge at an angle at approximately 90°; and said backing member includes a first section mounted on said support member and extending adjacent said path of movement of said other sheet toward said path of movement of said one sheet and a second section located closely adjacent said path of movement of said one sheet in juxtaposition with said engagement member.

3. The photographic apparatus of claim 1 in which said means for holding a supply of said one sheet comprises a portion of said first section of said housing providing a cavity for containing a coil of said one sheet, and said backing member includes a first section located between said path of movement of said other sheet and said cavity for retaining a coil of said one sheet within said cavity and a second section located closely adjacent said path of movement of said one sheet in juxtaposition with said engagement member.

4. The photographic apparatus of claim 1 in which said backing member and said support member comprise sections of a single element, said support member including a first section secured to said second housing section and a second section extending toward and past said path of said other sheet adjacent an edge thereof, and said backing member includes a first section disposed between said path of said other sheet and said means for holding a supply of said one sheet and a second section in the form of a foot located closely adjacent said path of movement of said one sheet in juxtaposition with said engagement member.

5. The photographic apparatus of claim 1 in which said control means include two of said engagement members positioned for engaging portions of said one sheet adjacent the lateral edges thereof and a pair of said backing members are provided supported on a pair of said support members in juxtaposition with said engagement members.

6. Photographic apparatus for exposing and processing successive areas of a photosensitive sheet, said apparatus comprising, in combination:

a housing comprising first and second sections movable with respect to one another between closed and open positions to permit loading of said photosensitive sheet and a second sheet, coupled with said photosensitive sheet at the leading ends of said sheets, into said housing;

said first section including a first storage means for holding a supply of said photosensitive sheet at one end of said housing, a second storage means for holding a supply of said second sheet at the other end of said housing, and means for supporting successive areas of said photosensitive sheet intermediate said storage means in position for exposure;

said second section including means cooperating with said last-mentioned means to support said areas in position for exposure;

said housing sections including means cooperating to guide said sheets along convergent paths into superposition within said housing near said other end thereof;

a pair of juxtaposed pressure members for pressing said superposed sheets togther, one of said pressure members being mounted on said first section and the other of said pressure members being mounted on said second section;

control means mounted on said first section including an engagement member projecting into said path of movement of said second sheet adjacent said other pressure member for engaging portions of said second sheet to arrest the movement of said sheets through said apparatus; and support means for supporting said second sheet in engagement with said engagement member, said support means comprising a first portion mounted on said second housing section and extending past and to one side of said path of movement of said second sheet toward said first housing section, and a second portion located between said path of movement of said second sheet and said path of movement of said photosensitive sheet and including a section disposed adjacent said path of movement of said photosensitive sheet in juxtaposition with said engagement member.

7. The photographic apparatus of claim 6 in which said means for holding a supply of said second sheet comprise a portion of said first section of said housing providing a cavity for containing a coil of said second sheet, and said second portion of said support means includes another section located between said path of movement of said photosensitive sheet and said cavity for retaining a coil of said second sheet within said cavity.

8. The photographic apparatus of claim 7 in which said control means include two of said engagement members positioned for engaging portions of said second sheet adjacent the lateral edges thereof, and said support means include two of said second portions located in juxtaposition with said engagement members.

References Cited

The following references, cited by the Examiner, are of record in the patented file of this patent or the original patent.

UNITED STATES PATENTS 3,113,497 12/1963 Eloranta ---------- 95—13

NORTON ANSHER, *Primary Examiner.*

G. M. HOFFMAN, *Assistant Examiner.*

U.S. Cl. X.R.

95—89